J. LUNDGREN.
Gas Heater.

No. 106,070.   Patented Aug. 2, 1870.

Witnesses
Henry N. Miller
Chs Kenyon

Inventor
Jno. Lundgren.
Chipman Hosmer & Co.
Attorneys

UNITED STATES PATENT OFFICE.

JOHN LUNDGREN, OF NEW YORK, N. Y.

GAS-HEATER.

Specification forming part of Letters Patent No. 106,070, dated August 2, 1870.

*To all whom it may concern:*

Be it known that I, JOHN LUNDGREN, of New York, in the county of New York and State of New York, have invented a new and valuable Improvement in Gas-Stoves; and I do hereby declare that the following is a full, clear, and exact description of the construction and operation of the same, reference being had to the annexed drawings, making a part of this specification, and to the letters and figures of reference marked thereon.

Figure 1:
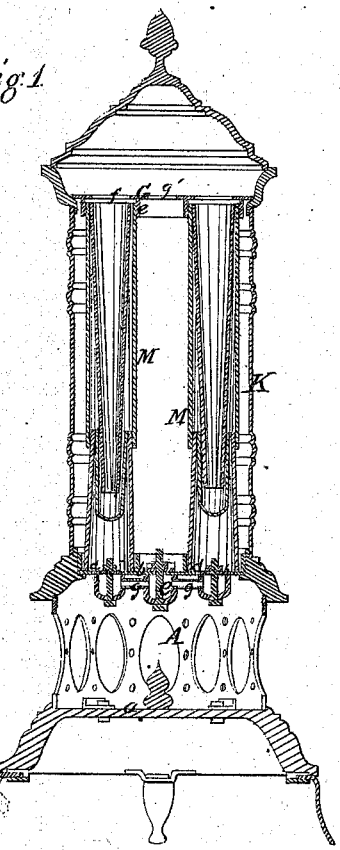
Figure 2:
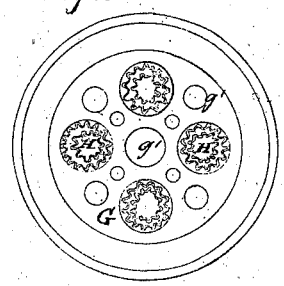
Figure 4:
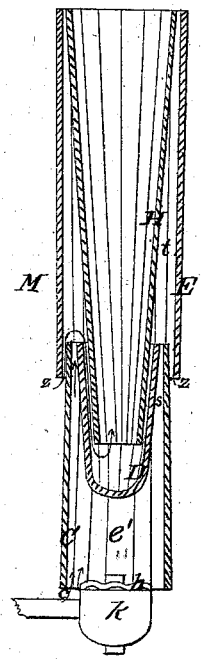
Figure 5:
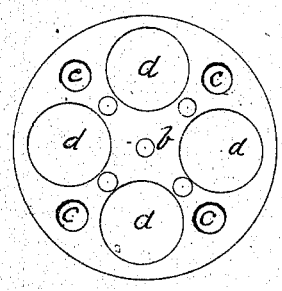
Figure 3:
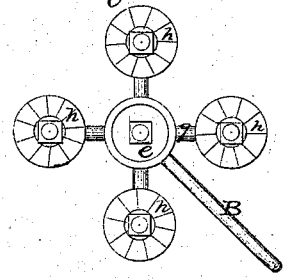

Figure 1 of the drawings is a central vertical section of my invention. Fig. 2 is a plan view of the furnace with top removed. Fig. 3 is a view showing arrangement of the burners. Fig. 4 is an enlarged sectional view of the corrugated pipes. Fig. 5 represents a plan view of the upper plate of the cast-iron base.

My invention relates to gas-stoves; and it consists mainly in the construction and novel arrangement of the flues through which the products of combustion pass, the walls thereof being corrugated vertically to present a larger radiating-surface, and so arranged as to be readily heated by the gas-flame.

The letter A of the drawings designates a cast-iron base, provided with bottom $a$ and top $b$. Openings are made in the side and bottom of this chamber for the admission of air. Air-openings $c$ are also made in the top plate $b$, also openings $d$ for the passage of the burners.

B represents the gas-pipe, attached to the central bowl, $e$, from which radiate the pipes $g$ $g$ to feed the burners $h$ $h$.

C represents a corrugated cast-iron cylinder whose lower circumference fits within a flange formed around the opening $d$. Air is admitted around the burner into the chamber $e'$, formed by this cylinder, to supply oxygen to the flame.

Within the chamber $e'$ depends the cast-iron pot or radiator D. It is provided with lugs extending outward from the upper part of its wall, whereby it is supported on the upper edge of the wall C. It is also corrugated, but in such a manner that there will be a free circulation allowed between its wall and that of the cylinder C.

Resting upon the top of the cylinder C, and extending upward to the top of the stove, is the corrugated sheet-iron cylinder E. Its upper end is held in place by means of a flange, $e$, formed around the opening $f$ in the plate G. This flange projects downward to receive the end of the corrugated cylinder.

H designates a smaller corrugated tube, tapering downward, and having its lower end inserted into the pot D. At its upper end it approaches the wall of the cylinder E. The heated air and products of combustion pass off mainly through the tapering flue H, being guided thereto by the flues formed by the different tubes. The combustion of the gases in the chamber $e$ heats directly the pot D, and at the same time the heated products of combustion pass upward through the flue $s$ into the flue $t$. The air in the lower part of the pot D becomes intensely heated by the action of the flame below it, and thence rises vertically through the flue H. Air is supplied to the pot D from the flue $t$, the hot air which rises into this flue from the chamber $e'$ being tempered by the admission of cool air at the point $z$.

K represents the outer cylinder of the stove, which forms a hot-air chamber about the corrugated pipes above described. Air is admitted into this chamber through the openings $c$ in the plate $b$, and finds its exit through the apertures $g'$ in the upper plate, G. The openings $c$ are more abundant and larger than the exits $g'$, in order that the air may be retained to a certain extent within the cylinder K and in contact with the heated corrugated pipes M. The number of burners will determine the number of corrugated pipes M within the chamber K. With a single burner one central pipe may be employed. In the example taken for illustration in the drawings four are used, arranged at equal distances from center or axial line of the stove. The walls of the flues being corrugated, a greater amount of heat is radiated therefrom, and the irregular nature of the corrugations allows the walls to be brought in contact with each other at certain points without obstructing the passage of the gases between them. Each gas-cup $k$ is connected to the central bowl, as shown. The gas escapes from under the edge of the burner-plate $h$, which is corrugated and bolted to the cup $k$.

What I claim as my invention, and desire to secure by Letters Patent, is—

1. In combination with the hot-air cylinder K of a gas-stove, one or more corrugated radiators, M, consisting each of the corrugated tubes C E H, and the heater-pot D, having corrugated wall, when constructed and arranged to operate as and for the purposes specified.

2. In the radiator M of a gas-stove, the arrangement of the generating-chamber $e'$, heating-pot D, flues $s\ t$ H, and openings $z\ d\ f$, as shown and described.

3. The gas-cup $k$, in combination with the corrugated burner-plate $h$, as specified.

In testimony that I claim the above I have hereunto subscribed my name in the presence of two witnesses.

JOHN LUNDGREN.

Witnesses:
GEO. G. SICKLES,
HENRY ALBER.